United States Patent
Hsu et al.

(10) Patent No.: US 8,541,984 B2
(45) Date of Patent: Sep. 24, 2013

(54) CHARGING SYSTEMS CAPABLE OF DETERMINING THE KIND OF COUPLED DEVICE AND RELATED METHODS THEREOF

(75) Inventors: Chih-Yuan Hsu, Hsinchu (TW); Tung-Yi Wang, Taipei Hsien (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1433 days.

(21) Appl. No.: 12/020,590

(22) Filed: Jan. 28, 2008

(65) Prior Publication Data

US 2009/0189569 A1 Jul. 30, 2009

(51) Int. Cl.
*H02J 7/00* (2006.01)
*H02J 7/06* (2006.01)

(52) U.S. Cl.
USPC .................... 320/138; 320/106; 320/163

(58) Field of Classification Search
USPC .................. 320/103, 106, 138, 163
See application file for complete search history.

(56) References Cited

U.S. PATENT DOCUMENTS

| | | | |
|---|---|---|---|
| 6,137,265 A | 10/2000 | Cummings | |
| 6,507,172 B2 | 1/2003 | Sherman | |
| 6,614,206 B1 | 9/2003 | Wong | |
| 6,809,649 B1 | 10/2004 | Wendelrup | |
| 7,271,568 B2 * | 9/2007 | Purdy et al. | 320/106 |
| 7,657,290 B2 * | 2/2010 | Veselic et al. | 455/572 |
| 8,242,742 B2 * | 8/2012 | Kao et al. | 320/114 |

FOREIGN PATENT DOCUMENTS

CN 101022278 A 8/2007

* cited by examiner

*Primary Examiner* — Richard V Muralidar
(74) *Attorney, Agent, or Firm* — Winston Hsu; Scott Margo

(57) ABSTRACT

Disclosed is a method for controlling charging current to a battery of a charging system, performed by a control unit of the charging system. The method includes: (a) detecting that a device is coupled to the charging system and determining what kind of the device the charging system is coupled to; (b) adjusting the charging current to a level according to the coupled device. The charging current is generated by the coupled device.

17 Claims, 5 Drawing Sheets

US 8,541,984 B2

CHARGING SYSTEMS CAPABLE OF DETERMINING THE KIND OF COUPLED DEVICE AND RELATED METHODS THEREOF

BACKGROUND OF THE INVENTION

The present invention relates to charging systems and related methods thereof, and particularly relates to control charging current to a battery, wherein the charging current is generated by an external device.

A portable electronic device typically contains a battery and battery charging circuits. Various types of chargers may be employed to charge the embedded battery via the battery charging circuits. For example, the charger supporting the USB (Universal Serial Bus) specification may generate and provide current between 300 mA and 1800 mA with a voltage of 5V+−5% to charge the portable electronic device via a USB type A connector thereof. Conventional battery charging circuits limit the provided current to a fixed level, regardless of actual current that the charger provided, and types of chargers.

Therefore, charging systems and related methods thereof are required to dynamically adjust charging current contingent upon actual current that the charger provided, and types of chargers.

SUMMARY OF THE INVENTION

Therefore, an object of the present invention is to provide charging systems and related methods thereof, which can adjust charging current dynamically.

Specifically, the objective of the present invention is to provide charging systems and related methods thereof, which can adjust charging current in response to current generated by an external device, and types of various external devices.

An embodiment of a method for controlling charging current to a battery of a charging system, performed by a control unit of the charging system. The method comprises: (a) detecting that a device is coupled to the charging system; (b) adjusting the charging current to a level. The charging current is generated by the coupled device.

An embodiment of a charging system comprises a battery and a control unit. The control unit coupled to the battery detects that a device is coupled to the charging system, and adjusts charging current to the battery to a level. Wherein the charging current is generated by the coupled device.

An embodiment of a charging system comprises a detection unit. The detection unit generates a first voltage when the coupled device comprises a universal (USB) interface with two connected data lines, and generating a second voltage when the coupled device comprises the USB interface with two disconnected data lines These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
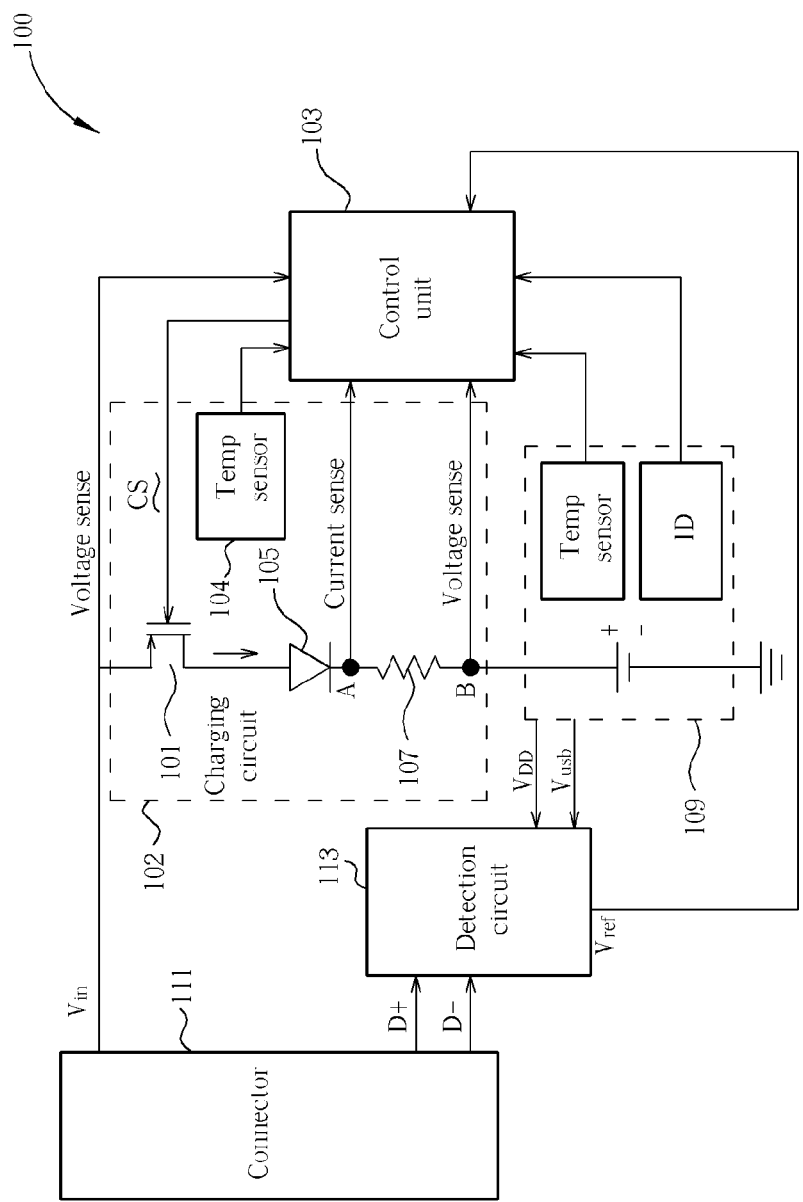
FIG. 1 is a schematic diagram illustrating a charging system according to an embodiment of the present invention.

FIG. 1 is a charging system 100 according to an embodiment of the invention. As shown in FIG. 1, the charging system 100 mainly comprises a charging circuit 102, a control unit 103, a battery set 109, a connector (for example, a USB connector) 111, and a detection circuit 113. The charging circuit 102 comprises a current control device 101 (for example, a P-MOS, an N-MOS, a BJT, and the similar), a temperature sensor 104 measuring temperature of the current control device 101, a diode 105 and a resistor 107. When a charger or computing apparatus such as a personal computer, a notebook, a workstation and the similar, is coupled to the charging system 100 via the connector 111, current with a voltage $V_{in}$ of 5V+−5% provided by the charger or computing apparatus flows to a battery of the battery pack 109 through the current control device 101, the diode 105 and the resistor 107. The resistor 107 is coupled between terminals A and B. The control unit 103 may measure current at the terminal A, and voltage at the terminal B. The diode 105 is coupled between the current control device 101 and the resistor 107. The current control device 101 is coupled between the voltage $V_{in}$ and the diode 105. The control unit 103 controls the current control device 101 to adjust current flowed to the battery by issuing control signals CS according to the sensed voltage $V_{in}$, or $V_{ref}$, current at the terminal A, or temperature of the current control device 101 via the temperature sensor 104, or any combinations thereof. The battery pack 109 further comprises a temperature sensor measuring temperature of the battery, and an identification (ID) unit providing profile information regarding the battery. Details of the detection circuits 113, and adjustment methods performed by the control unit 103 are to be described in the following.

Figure 2:
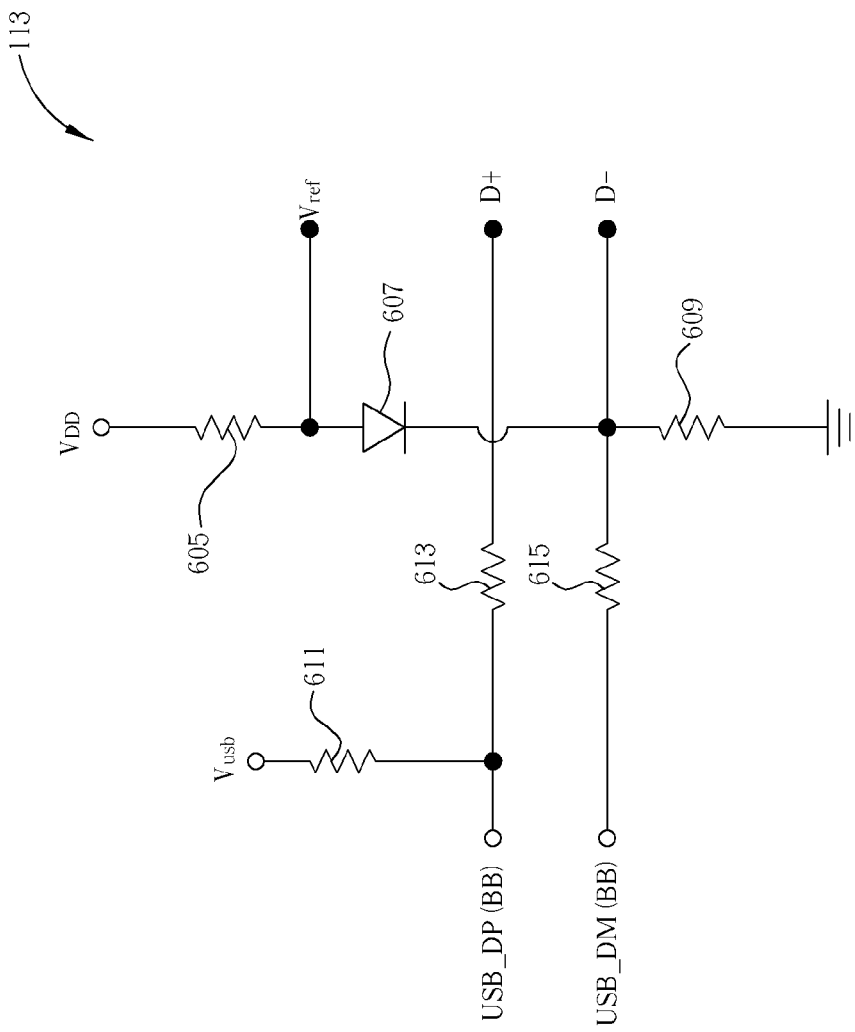
FIG. 2 is a circuit diagram illustrating detection circuits according to an embodiment of the present invention.

FIG. 2 is a diagram illustrating detection circuits (e.g. 113 of FIG. 1) according to an embodiment of the invention. Of course, it is not meant to limit the scope of the present invention; detection circuits with different but similar structures that perform the same function should also fall in the scope of the present invention. In this embodiment, the detection circuit comprises resistors 605, 609, 611, 613 and 615, and a diode 607. When a charger or a computing apparatus is coupled to a charging system (e.g, 100 of FIG. 1), two data lines are coupled between a control unit (e.g. 103 of FIG. 1) and the charger or the computing apparatus through resistors 613 and 615 for matching of the characteristic impedance. Terminals D+ and D− are coupled to the connected charger or computing apparatus. Those skilled in the art may realize that the terminals USB_DP(BB) and USB_DM(BB) are coupled to the control unit for data transmission. A voltage $V_{ref}$ on a node between the resistor 605 and the diode 607 is provided to the control unit. The resistor 611 is coupled between a power voltage $V_{usb}$ and the terminal USB_DP(BB). The power voltage $V_{usb}$ may be 3.3V in order to conform to the universal serial bus (USB) standard. The resistor 605 is coupled between the diode 607 and a power voltage $V_{DD}$. The power voltage $V_{DD}$, such as 2.8V, is lower than the power voltage $V_{usb}$. The diode 607 is coupled between resistors 605 and 609. The resistor 609 is coupled between the terminal D−, the diode 607 and ground. The voltage $V_{ref}$ varies with statuses of two data lines coupled to terminals D+ and D−. It is to be understood that the USB interface further comprises a power line.

Types of the coupled charger or computing apparatus can be determined with reference to the voltage $V_{ref}$. For an example, a computing apparatus may comprise two data lines, one is grounded and coupled to the terminal D−, and the other is coupled to the terminal D+ via a connector (e.g. 111 of FIG. 1). Thereafter, the voltage $V_{ref}$ is substantially on a ground level. Therefore, when detecting that the voltage $V_{ref}$ is lower than a first threshold (e.g. 1V), the control unit determines that a computing apparatus is coupled to the charging system. It is to be understood that the first threshold can be configured to a value lower than a half of the power voltage $V_{DD}$. For another example, a first type of charger may comprise two data lines been respectively coupled to terminals D− and D+, and these two data lines are connected. Thereafter, the output voltage $V_{ref}$ substantially equals the power voltage $V_{DD}$ because $V_{usb}$ is higher than $V_{DD}$, and current can not flow through the diode 607. Therefore, when detecting that the voltage $V_{ref}$ exceeds a second threshold (e.g. 2V), the control unit determines that a first type of charger is coupled to the charging system. It is to be understood that the second threshold can be configured to a value higher than a half of the power voltage $V_{DD}$. For still another example, a second type of charger may comprise two data lines been respectively coupled to terminals D− and D+, and these two data lines are disconnected. Thereafter, the output voltage $V_{ref}$ substantially equals a half of the power voltage $V_{DD}$ because currents can separately flow to the resistors 609 and 615 through the diode 607. Therefore, when detecting the voltage $V_{ref}$ between the first and second thresholds, the control unit determines that a second type of charger is coupled to the charging system. In some embodiments, the voltage $V_{ref}$ may be further input to an analog to digital converter (ADC) of the control unit as reference signals for adjustment methods.

Figure 3:
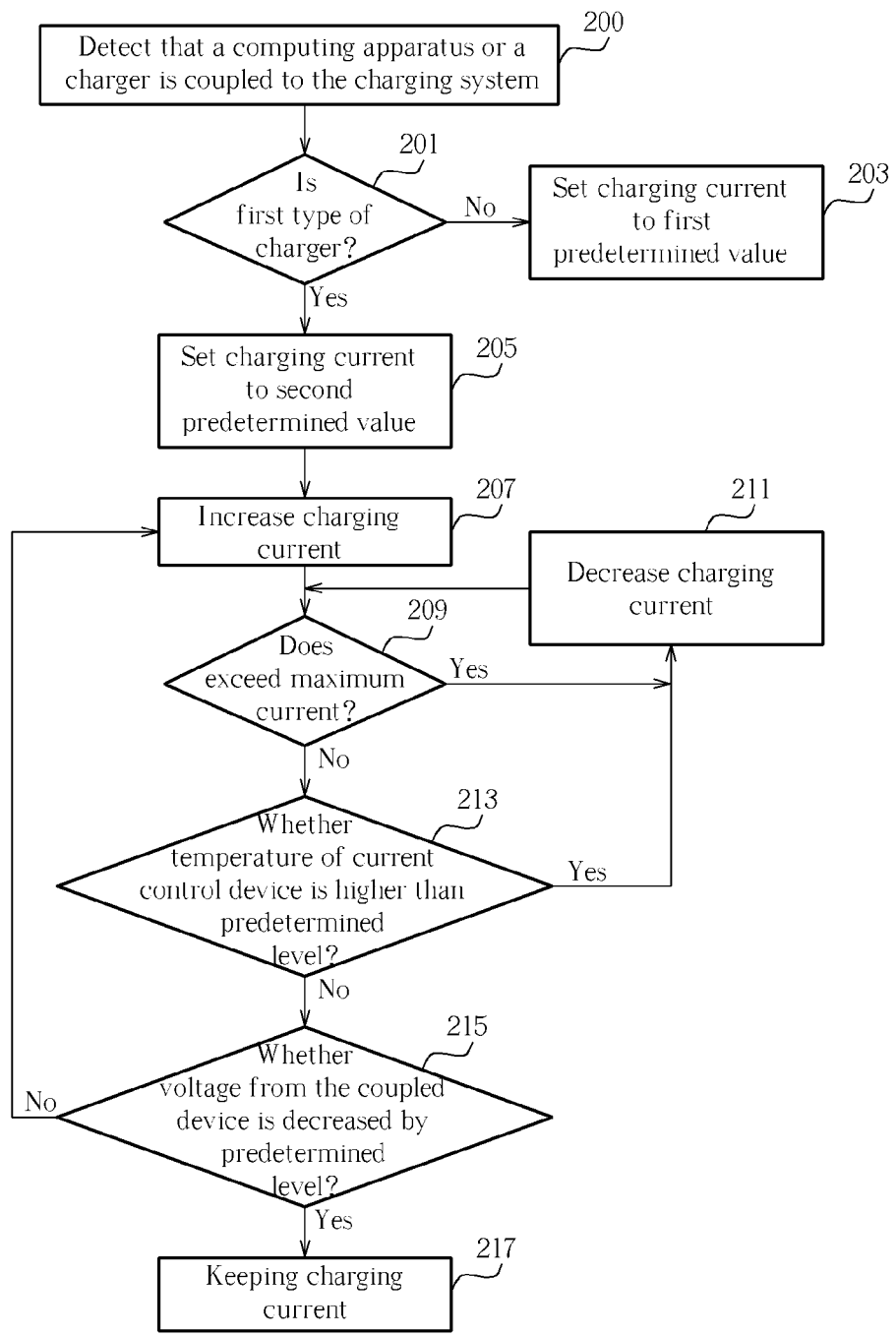
FIG. 3 is a flowchart illustrating an adjustment method according to an embodiment of the present invention.

FIG. 3 is a flowchart illustrating an adjustment method according to an embodiment of the present invention.

As shown in FIG. 3, the control method comprises:

Step 200
Detect that a device such as a computing apparatus or charger is coupled to a charging system (e.g. FIG. 1).

Step 201
Determine whether the coupled device is the described first type of the charger. If the coupled device is the described first type of charger, go to step 205; if not, go to step 203. The determination may be achieved by detecting a voltage outputted from detection circuits (e.g. $V_{ref}$ of FIG. 2).

Step 203
Set the charging current to a first predetermined value by controlling a current control device (e.g. 101 of FIG. 1).

Step 205
Set the charging current to a second predetermined value by controlling a current control device (e.g. 101 of FIG. 1).

For example, when the coupled device is the described first type of charger, the charging current from the coupled device to a battery may be limited between 300-1800 mA. When the coupled device is not the described first type of charger, the charging current from the coupled device to a battery may be limited to 500 mA. Therefore, the first predetermined value is lower than 500 mA, and the second predetermined value is between 300 mA and 1800 mA.

Step 207
Increase the charging current by controlling a current control device (e.g. 101 of FIG. 1).

Step 209
Determine whether the charging current exceeds the maximum value. If so, go to step 211; if not, go to step 213.

Step 211
Decrease the charging current by controlling a current control device (e.g. 101 of FIG. 1).

Step 213
Determine whether the temperature of the current control device is higher than a predetermined value. If so, go to step 211 to decrease the charging current, resulting in the temperature of the current control device decreases. If not, go to step 215.

A temperature sensor can be utilized to detect the temperature of the current control device, for example, 104 of FIG. 1.

Step 215
Determine whether a voltage of input current from the coupled device (e.g. $V_{in}$ of FIG. 1) is decreased exceeding a predetermined level such as 0.5V. If not, go back to the step 207 to increase the charging current. If yes, go to step 217 to maintain the charging current. Specifically, in step 217, the control unit does not adjust the charging current.

Via the steps 207-217, the flowed current can be dynamically increased, thereby decreasing charging time. Also, it should be noted that the flowchart shown in FIG. 3 is just an example and is not meant to limit the scope of the present invention. For example, the order of the steps 209, 213 and 215 may be changed with relevant modification of process flow, and part or all of the steps 207-217 may be removed from the adjustment method shown in FIG. 3.

Additionally, as known by persons skilled in the art, a current control device such as a P-MOS, N-MOS, BJT and the similar, has a saturation region; that is, a region in which the current control device can provide the maximum current. Also, the conductive device has a smaller resistance value in the saturation region. Therefore, the adjustment method according to an embodiment of the present invention can further control the current control device to operate in the saturation region such that the controllable conductive device provides the maximum current.

Figure 4:
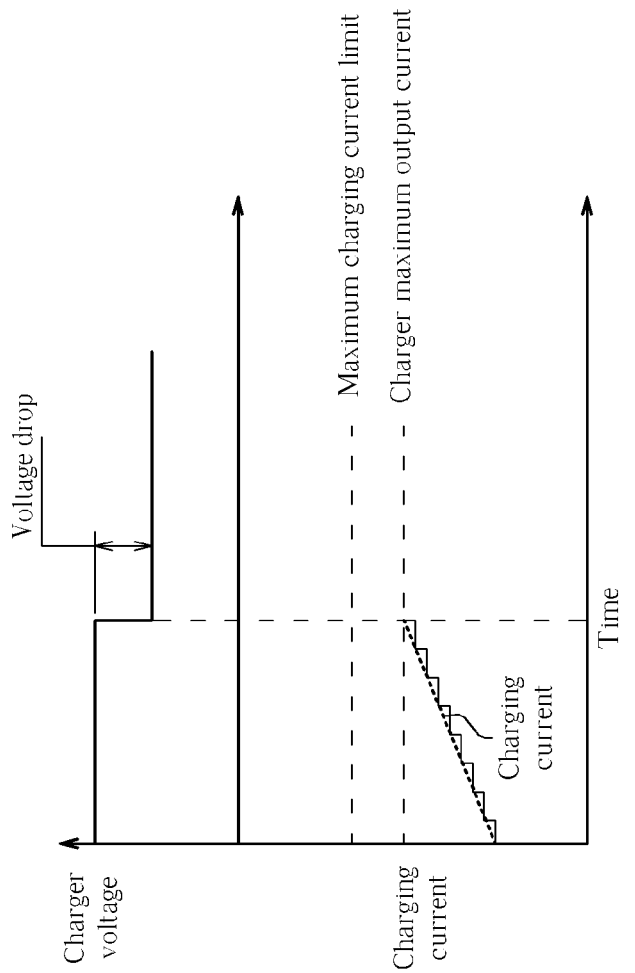
FIG. 4 is an exemplary charging timing diagram during charging current control according to an embodiment of the present invention.

FIG. 4 is an exemplary charging timing diagram during charging current control by an embodiment of adjustment methods shown in FIG. 3. As shown in FIG. 4, the charging current can be increased step by step, or linearly, illustrated by a step-wise and solid line, or a straight and dashed line. There are two limits for the charging current: one is the "charger maximum output current", and the other is the "maximum charging current limit". The "charger maximum output current" indicates the maximum current that the charger can support, and the "maximum charging current limit" indicates the maximum value in step 209. The maximum charging current limit may be decided according to the ID information of a battery. As shown in FIG. 4, when detecting that a input voltage (e.g. $V_{in}$ of FIG. 1) is dropped by a predetermined level (e.g. 0.5V), it is determined that the charging current reaches the "charger maximum output current", as a result, the charging current should be decreased. It is to be understood that the voltage drop is generated by the first type of charger when detecting that charging circuits consume excessive current than the "charger maximum output current".

Figure 5:
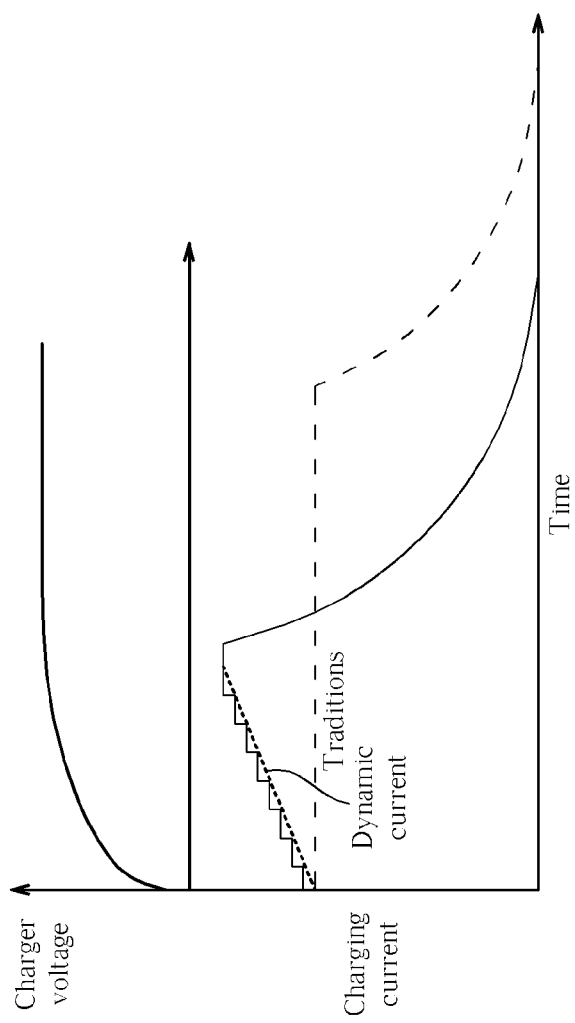
FIG. 5 is a schematic diagram illustrating battery I-V curve during charging current control according to an embodiment of the present invention.

FIG. 5 is a schematic diagram illustrating battery I-V curve during charging current control by an embodiment of adjustment methods. Referring to above-mentioned methods, the charging current is increased until the battery almost reaches a predetermined voltage level (that is, the battery is fully charged), as shown in a bold line. However, a traditional charging system would keep a constant charging current, as shown in a dashed line. Therefore, a charging system utilizing the control mechanism according to an embodiment of the present invention can reduce charging time than that of a traditional charger.

According to the above-mentioned method and circuits, the charging current of a charger can be adjusted according to its charger type. The charging current can further be adjusted according to other characteristics sensed by a control unit during charging. Therefore, the charging system not only adjusts charging current for different types of chargers, but adjusts charging current as higher as possible to reduce charging time without damages caused by excessive charging current. Those skilled in the art will readily observe that numerous modifications and alterations of the device and method may be made while retaining the teachings of the invention.

What is claimed is:

1. A control method for controlling charging current to a battery of a charging system, performed by a control unit of the charging system, comprising:
   detecting that a device is coupled to the charging system; and
      determining whether the coupled device comprises an USB (Universal Serial Bus) interface with two connected data lines;
      adjusting the charging current increasingly from a first level when the coupled device comprises the USB interface with two connected data lines; and
      adjusting the charging current to a second level when the coupled device comprises the USB interface with two disconnected data lines;
      wherein the charging current is generated by the coupled device.

2. The control method of claim 1, wherein the first level is between 300 mA and 1800 mA, and the second level is lower than 500 mA.

3. The control method of claim 1, wherein the charging system comprises a current control device for adjusting the charging current to the battery, and
   increasing the charging current from the first level by controlling the current control device until that temperature of the current control device exceeds a predetermined level.

4. The control method of claim 1, wherein the charging system comprises a current control device for adjusting the charging current to the battery, and
   increasing the charging current from the first level by controlling the current control device until that the charging current exceeds the maximum charging current limit of the battery.

5. The control method of claim 1, wherein the charging system comprises a current control device for adjusting the charging current to the battery, and
   increasing the charging current from the first level by controlling the current control device until detecting that a voltage provided by the coupled device is dropped.

6. The control method of claim 5, wherein the charging current is increased step by step.

7. The control method of claim 5, wherein the charging current is increased linearly.

8. A charging system with a battery, comprising:
   a control unit, coupled to the battery, for detecting that a device is coupled to the charging system, and adjusting charging current to the battery to a level; and
   a detection unit, wherein the coupled device provides the charging current through a universal serial bus (USB) interface, the detection unit generates a first voltage when the coupled device comprises the USB interface with two connected data lines, and generates a second voltage when the coupled device comprises the USB interface with two disconnected data lines;
   wherein the control unit adjusts the charging current increasingly from a first level when detecting the first voltage from the detection unit, and adjusts the charging current to a second level when detecting the second voltage from the detection unit; wherein the charging current is generated by the coupled device.

9. The charging system of claim 8, further comprising a current control device and a temperature sensor for sensing temperature of the current control device, the control unit increases the charging current from the first level by controlling the current control device until that temperature sensed by the temperature sensor exceeds a predetermined level.

10. The charging system of claim 8, further comprising a current control device and an identification (ID) unit, the control unit determines the maximum charging current limit of the battery according to profile information provided by the ID unit, and increases the charging current from the first level by controlling the current control device until that the charging current exceeds the maximum charging current limit of the battery.

11. The charging system of claim 8, further comprising a current control device, the control unit increases the charging current from the first level by controlling the current control device until detecting that a voltage provided by the coupled device is dropped.

12. The charging system of claim 11, wherein the charging current is increased until detecting that a voltage provided by the coupled device is dropped by a predetermined value.

13. A charging system, coupled by a device, comprising:
   a detection unit, for generating a first voltage when the coupled device comprises a universal (USB) interface with two connected data lines, and generating a second voltage when the coupled device comprises the USB interface with two disconnected data lines;
   a battery; and
   a control unit, coupling to the detection device and the battery, for adjusting a charging current to the battery, generated by the coupled device, according to the generated first or second voltage;
   wherein after adjusting the charging current according to the generated first voltage, the control unit increases the charging current from the adjusted charging current.

14. The charging system of claim 13, wherein the detection unit comprises:
   a first terminal;
   a second terminal;
   a third terminal;
   a fourth terminal;
   a fifth terminal;

a first power source;
a second power source; and
a diode,
wherein the first power source is coupled between the first and second terminals, the fifth terminal is coupled between the second power source and the diode, the diode is coupled between the third, fourth and fifth terminals, and a first voltage provided by the first power source is higher than a second voltage provided by the second power source.

15. The charging system of claim 14, wherein the coupled device comprises a first data line been coupled to the second terminal, and a second data line been coupled to the fourth terminal, the first and second data lines are connected, and a voltage at the fifth terminal substantially equals the first voltage.

16. The charging system of claim 14, wherein the first voltage is substantially 3.3V.

17. The charging system of claim 14, wherein the coupled device comprises a first data line been coupled to the second terminal, and a second data line been coupled to the fourth terminal, the first and second data lines are disconnected, and a voltage at the fifth terminal substantially equals a half of the second voltage.

\* \* \* \* \*